United States Patent
Berels

(10) Patent No.: US 6,781,252 B2
(45) Date of Patent: Aug. 24, 2004

(54) METHOD AND APPARATUS FOR STARTING AN ENGINE USING A STARTER/ALTERNATOR AND AN ACCESSORY DRIVE

(75) Inventor: David Jeffeory Berels, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,050

(22) Filed: Mar. 14, 2002

(65) Prior Publication Data

US 2003/0173783 A1 Sep. 18, 2003

(51) Int. Cl.$^7$ .................................................. H02P 9/04
(52) U.S. Cl. .............................. 290/43; 290/44; 290/55
(58) Field of Search ........................... 290/43, 44, 55, 290/31–34, 46–48, 40 R; 123/179, 28–29; 74/6, 7 R; 180/53.1, 5, 8

(56) References Cited

U.S. PATENT DOCUMENTS

| 4,235,216 A | 11/1980 | Miles |
|---|---|---|
| 4,495,905 A | 1/1985 | Morishita et al. |
| 5,441,122 A | 8/1995 | Yoshida |
| 5,549,174 A | 8/1996 | Reis |
| 5,635,805 A | 6/1997 | Ibaraki et al. |
| 5,762,156 A | 6/1998 | Bates et al. |
| 5,847,470 A | 12/1998 | Mitchell |
| 5,934,395 A | 8/1999 | Koide et al. |
| 6,026,921 A | 2/2000 | Aoyama et al. |
| 6,077,186 A | 6/2000 | Kojima et al. |
| 6,166,525 A | 12/2000 | Crook |
| 6,202,776 B1 | 3/2001 | Masberg et al. |
| 6,205,379 B1 | 3/2001 | Morisawa et al. |
| 6,223,846 B1 | 5/2001 | Schechter |

*Primary Examiner*—Nicholas Ponomarenko
*Assistant Examiner*—Iraj A. Mohandesi May
(74) *Attorney, Agent, or Firm*—Artz & Artz; Carlos Hanze

(57) ABSTRACT

A system (40) for starting an internal combustion engine (12) of an automotive vehicle (10) has a controller (54) coupled to a starter/generator (42). The engine (12) has a crankshaft (50) and an engine accessory assembly that includes an electric motor (76) and a clutch (74). The controller (54) initiates the rotation of the crankshaft (50) with the starter/generator (42) and the electric motor (76) engaged to the crankshaft through the clutch (74), simultaneously. The controller (54) starts the engine (12) when the crankshaft (50) reaches a predetermined speed.

20 Claims, 3 Drawing Sheets

METHOD AND APPARATUS FOR STARTING AN ENGINE USING A STARTER/ALTERNATOR AND AN ACCESSORY DRIVE

BACKGROUND OF INVENTION

The present invention relates generally to automotive vehicles having internal combustion engines having starter/generators and, more specifically, to starting an engine using a starter/generator and an accessory drive for assistance.

Automotive vehicles with internal combustion engines are typically provided with both a starter motor and alternator. In recent years, a combined alternator and starter motor has been proposed. Such systems have a rotor mounted directly to the crankshaft of the engine and a stator sandwiched between the engine block and the bell housing of the transmission. During initial startup of the vehicle, the starter/generator functions as a starter. While functioning as a starter, the starter/generator rotates the crankshaft of the engine while the cylinders are fired.

After the engine is started, the starter/generator is used as a generator to charge the electrical system of the vehicle.

In foreseeable automotive applications, the engine may be shut down during stops (e.g., red lights). When the accelerator is depressed, the starter/generator starts the motor and the engine will resume firing. Thus, many startups may occur over the course of a trip.

One problem associated with stopping the engine when the vehicle stops is that accessories that are driven by an engine drive belt are no longer spinning. These accessories include an air conditioning compressor. When the vehicle is turned off and the ambient temperature is hot, the cabin temperature may increase rapidly.

To accomplish the cold starting the integrated starter/generator is required to rotate the engine and have a very large starting torque from the at rest position. As a result of the high engine starting torque at low speed, the operational point is skewed to the lower speed range and hence the starter/generator typically has a lower efficiency and lower output at the high speed range.

Another limiting factor in the cold starting torque of the starter/generator system is the inverter of the starter/generator. The inverter is used to convert direct current voltage to variable frequency alternating current voltage which in turn drives the starter/generator. The inverter has several high current power transistors that are relatively expensive and increase in expense as the rated current increases. The starter/generator may be overdriven, in some cases up to ten times the rated value, for short periods of time in the range of 30 to 60 seconds. Overdriving the starter/generator is accomplished by increasing the input current. The power transistors, however, may also be overdriven but for very short periods of time in the millisecond range. Therefore, the inverter design typically must be rated for continuous operation at the peak rating of the starter/generator. This system disparity adds complexity and significant cost to the system.

It would therefore be desirable to reduce the amount of starting torque needed to be provided by the starter generator as well as allowing accessories to continue to operate.

SUMMARY OF INVENTION

The present invention improves the starting process of the invention.

In one aspect of the invention, a method of controlling the starting of an internal combustion engine having a starter/generator coupled to the crankshaft of the engine and an accessory coupled through a clutch to an engine drive where the accessory is driven by an electric motor includes operating the engine accessory with the motor having while the clutch is disengaged, engaging the clutch while operating the engine accessory with the motor, and while the clutch is engaged, starting the engine with the starter/generator.

In a further aspect of the invention, a system for an automotive vehicle includes an internal combustion engine having a crankshaft. A starter/generator is coupled to the crankshaft. An engine accessory assembly is coupled to the crankshaft. The assembly has a clutch and an electric motor. A controller is coupled to the starter/generator, the clutch and the motor. The controller initiates the rotation of said crankshaft with the starter/generator alternator and the electric motor engaged to the crankshaft through the clutch, simultaneously. The controller starts the engine when the crankshaft reaches a predetermined speed.

One advantage is that the starter alternator may be improved to more efficient at higher engine speeds due to the assistance of the driven accessory.

Other advantages and features of the present invention will become apparent when viewed in light of the detailed description of the preferred embodiment when taken in conjunction with the attached drawings and appended claims.

DETAILED DESCRIPTION

The present invention is described with respect to a particular configuration of a starter/generator. However, the teachings of the present invention may be applied to various starters for internal combustion engines.

Figure 1:
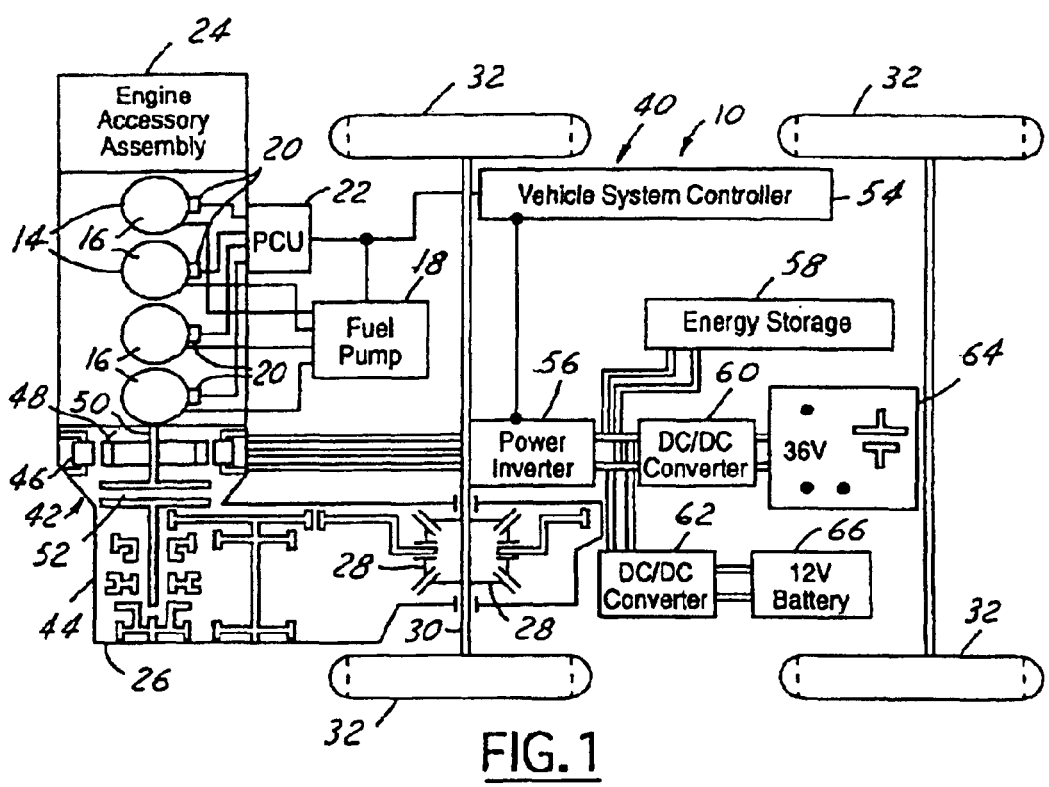
FIG. 1 is a schematic view of an automotive vehicle having a starter/generator system according to the present invention.

Referring now to FIG. 1, an automotive vehicle 10 is illustrated having an internal combustion engine 12 having cylinders 14 with pistons 16 located therein. Each cylinder 14 is coupled to a fuel pump 18 through a fuel injector (not shown) or other fuel delivery system. Each cylinder 14 also has a spark plug 20 or other ignition source coupled to a powertrain control unit. A powertrain control unit 22 controls the ignition timing and fuel pump operation 18 in a conventional manner subject to the improvements of the present invention.

Engine 12 has an engine drive driven accessory assembly 24 coupled to the engine. The engine drive accessory assembly 24 has a mechanical drive used to drive accessory. (shown below in FIG. 2) from the crankshaft of the engine. The drive itself is referred to as a front-end accessory drive (FEAD) is most often formed of a belt and pulleys. Examples of accessories include but are not limited to an air conditioning compressor and a power steering pump. The present invention is described with respect to an air conditioning compressor but the invention is not limited to such.

Engine 12 is coupled to a transmission 26. Transmission 26 may be automatic, manual or continuously variable. Transmission 26 is coupled to a differential 28 to drive an axle 30 to provide power to wheels 32. Of course, the present invention is also applicable to four-wheel drive systems in which all of the wheels 32 are driven. A starter/generator system 40 that includes a starter/generator 42 and its associated control electronics is coupled to engine 12. Of course, those skilled in the art will recognize other positions are available including but not limited to belt driven types. In the present invention, starter/generator 42 is positioned between a housing 44 of transmission 26 and the engine 12. Starter/generator 42 has a stator fixedly attached to bell housing 44 and a rotor 48 coupled to a crankshaft 50 of engine 12. A clutch 52 is used to engage and disengage engine 12 from transmission 26. As will be further described below, starter/generator 42 is used as a starter during engine startup and as an alternator to supply power to recharge the batteries of the vehicle and to supply electrical loads. Clutch 52 allows starter/generator 42 to start the engine prior to engagement of the transmission.

Starter/generator system 40 has a system controller 54 that is coupled to powertrain control unit 22 and to a power inverter 56. In practice, the power inverter 56 and system controller 54 may be contained in a single package. The inverter 56 is used to convert DC power to AC power in the motoring mode and AC power to DC power in power generation mode as will be further described below.

Power inverter 56 is coupled to an energy storage device 58 such as an ultra capacitor, a first DC to DC converter 60, and a second DC to DC converter 62. DC to DC converter 60 is coupled to a 36 volt battery 64. DC to DC converter 62 is coupled to a 12 volt battery 66. Of course, the actual battery voltage is dependent on the particular system to which it is attached.

Figure 2:
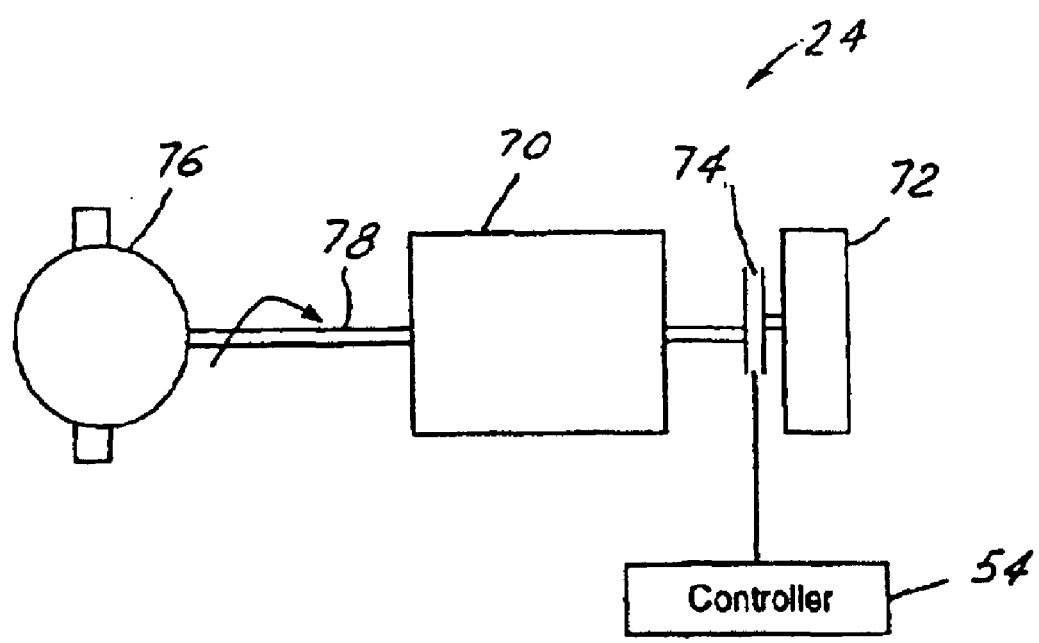
FIG. 2 is a more detailed schematic view of the engine accessory assembly of FIG. 1.

Referring now to FIG. 2, engine accessory assembly 24 is illustrated in further detail. Engine accessory 24 has an engine accessory such as air conditioning compressor 70. Compressor 70 is coupled to a drive pulley 72 through a clutch 74. Controller 54 is used to control the coupling and decoupling of clutch 74. Clutch 74 is engaged when the engine is in a normal operating mode. That is, when the engine is operating. As mentioned above, the engine may also be stopped when the vehicle is stationary such as being stopped at a stop light. An electric motor 76 is rotatably coupled to the compressor 70. Motor 76 is used to drive the motor during conditions where the engine is stopped. The clutch is disengaged during such conditions. A shaft 78 couples the electric motor 76 and compressor 70. Controller 54 is coupled to electric motor 76 and controls the operation thereof depending on the engine operating conditions. As mentioned above, in certain situations it may be advantageous to operate the motor 76 while the clutch 74 is engaged to assist the starter/alternator in starting the engine.

Figure 3:
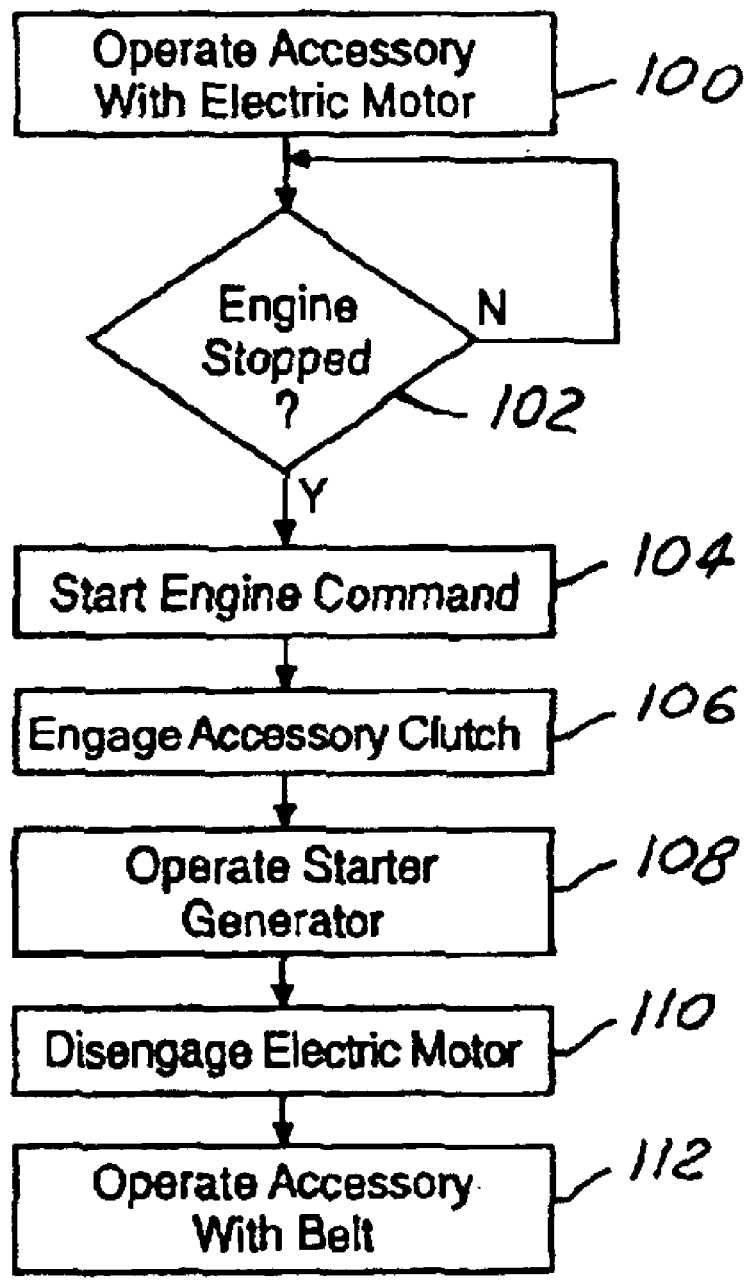
FIG. 3 is a flowchart illustrating the operation of the present invention.

Referring now to FIG. 3, the operation of the system according to the present invention is illustrated. In step 100, the accessories such as the air conditioning compressor is operated with the electric motor when the engine is stopped. In step 102, the checking of whether the engine is stopped is performed. If the engine is not stopped, step 102 is re-executed. In step 102 if the engine is stopped, step 104 is executed in which a start engine command is generated. The start engine command may be generated from the controller 54 described above. The start engine command engages the accessory clutch 74 in step 106 while the starter/generator is operated in step 108. Steps 106 and 108 are preferably performed simultaneously so that the motor of the accessory assembly assists the starter/generator in the rotation of the crankshaft and thus the starting of the engine. In step 110, once the engine has been started, the electric motor may be disengaged. In step 112 the accessory is operated with the drive or belt. When the engine is stopped the above process is again executed.

Advantageously, the system may be optimized to the high speed operation of the starter/generator because the motor of the accessory is used to generate additional torque to that of the starter/generator during starting. When the engine speed reaches a predetermined speed, the engine is started by providing fuel and spark thereto.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling the starting of an internal combustion engine having a starter/generator coupled to the crankshaft of the engine and an accessory coupled through a clutch to an engine drive, said accessory driven by an electric motor, said method comprising:

operating the engine accessory with the electric motor while the clutch is disengaged;

engaging the clutch while operating the engine accessory with the motor; and while the clutch is engaged and while operating the engine accessory with the motor, starting the engine by providing fuel and spark thereto while the starter/generator rotates the crankshaft.

2. A method as recited in claim 1 wherein when the engine is started, discontinuing operating the motor.

3. A method as recited in claim 1 wherein the accessory comprises an air conditioning compressor.

4. A method as recited in claim 1 wherein the accessory comprises a power steering pump.

5. A method as recited in claim 1 further comprising the step of generating power from the starter/generator after the step of starting the engine.

6. A method of stating an internal combustion engine of a vehicle with a starter/generator comprising:

rotating the crankshaft of the vehicle with the starter/generator;

rotating an accessory with an electric motor; and simultaneous with rotating the crankshaft of the vehicle with the starter/generator, engaging a clutch to rotate the crankshaft with the electric motor; and starting the engine by providing fuel and spark thereto.

7. A method as recited in claim 6 wherein when the engine is started, discontinuing operating the motor.

8. A method as recited in claim 6 wherein the accessory comprises an air conditioning compressor.

9. A method as recited in claim 6 wherein the accessory comprises a power steering pump.

10. A method as recited in claim 6 wherein starting the engine comprises operating a fuel pump; and providing fuel to cylinders of the engine with the fuel pump.

11. A method as recited in claim 6 further comprising generating power from the starter/alternator after starting the engine.

12. A system for an automotive vehicle comprising:

an internal combustion engine having a crankshaft;

a starter/generator coupled to the crankshaft;

an engine accessory assembly coupled to the crankshaft, said assembly having an accessory, a clutch and an electric motor;

a controller coupled to the starter/generator, the clutch and the motor, said controller initiating the rotation of said crankshaft simultaneously with the starter alternator and the electric motor engaged to the crankshaft through the clutch, said controller starting said engine by providing fuel and spark thereto when the crankshaft reaches a predetermined speed.

13. A system as recited in claim 12 further comprising a fuel pump.

14. A system as recited in claim 12 wherein said controller operating said fuel pump during starting the engine.

15. A system as recited in claim 12 wherein the accessory comprises an air conditioning compressor.

16. A system as recited in claim 12 wherein the accessory comprises a power steering pump.

17. A system as recited in claim 12 wherein said accessory is coupled to the accessory through a shaft.

18. A system as recited in claim 12 wherein said clutch is disengagably coupled to a pulley.

19. A system as recited in claim 12 wherein said pulley is rotatably coupled to said crankshaft.

20. A hybrid electric vehicle having the system as recited in claim 12.

* * * * *